(12) United States Patent
Fujioka et al.

(10) Patent No.: US 8,208,104 B2
(45) Date of Patent: Jun. 26, 2012

(54) TRANSFLECTIVE TYPE LIQUID CRYSTAL DISPLAY DEVICE

(75) Inventors: Kazuyoshi Fujioka, Osaka (JP); Masaaki Saitoh, Osaka (JP); Tomoo Furukawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 314 days.

(21) Appl. No.: 12/513,530

(22) PCT Filed: Oct. 19, 2007

(86) PCT No.: PCT/JP2007/070414
§ 371 (c)(1),
(2), (4) Date: May 5, 2009

(87) PCT Pub. No.: WO2008/099534
PCT Pub. Date: Aug. 21, 2008

(65) Prior Publication Data
US 2010/0073614 A1    Mar. 25, 2010

(30) Foreign Application Priority Data
Feb. 14, 2007  (JP) .................................. 2007-034078

(51) Int. Cl.
*G02F 1/1335* (2006.01)
(52) U.S. Cl. .......... 349/114; 349/117; 349/119; 349/121
(58) Field of Classification Search .................. 349/114, 349/117–121
See application file for complete search history.

(56) References Cited

U.S. PATENT DOCUMENTS

| | | | | |
|---|---|---|---|---|
| 6,970,218 B2* | 11/2005 | Fukuda et al. | ................. | 349/114 |
| 7,221,422 B2* | 5/2007 | Fukuda et al. | ................. | 349/120 |
| 7,292,297 B2* | 11/2007 | Jang et al. | ...................... | 349/114 |
| 7,505,097 B2* | 3/2009 | Luo et al. | ...................... | 349/113 |
| 2003/0156240 A1 | 8/2003 | Oda | | |
| 2004/0004686 A1 | 1/2004 | Ogawa | | |
| 2004/0027510 A1* | 2/2004 | Iijima et al. | ..................... | 349/61 |
| 2005/0186359 A1 | 8/2005 | Ishizuka | | |
| 2005/0190322 A1 | 9/2005 | Okabe et al. | | |
| 2005/0264732 A1 | 12/2005 | Matsushima | | |
| 2006/0227265 A1* | 10/2006 | Luo et al. | ...................... | 349/113 |
| 2007/0013837 A1 | 1/2007 | Ogawa | | |
| 2007/0126956 A1* | 6/2007 | Wu et al. | ....................... | 349/114 |
| 2007/0126963 A1* | 6/2007 | Yang et al. | ..................... | 349/119 |
| 2007/0263167 A1 | 11/2007 | Oda | | |

FOREIGN PATENT DOCUMENTS

| | | |
|---|---|---|
| JP | 2001-066585 | 3/2001 |
| JP | 2003-149636 | 5/2003 |

OTHER PUBLICATIONS

International Search Report for PCT/JP2007/070414, mailed Dec. 4, 2007.

* cited by examiner

*Primary Examiner* — Rhonda Peace
(74) *Attorney, Agent, or Firm* — Nixon & Vanderhye P.C.

(57) ABSTRACT

A liquid crystal display device of the present invention is a transflective liquid crystal display device that is provided with a backlight, a liquid crystal cell (10), and a reflective electrode (32) provided in the liquid crystal cell (10), and that displays an image through both a reflective display region (a) and a transmissive display region (b). In this liquid crystal display device, a front-side λ/4 plate (wave plate) for a reflective display is further provided on a side from which external light enters the liquid crystal cell (10), and a thin film (33) is provided, on the reflective electrode (32), for correcting a change in chromaticity caused by wavelength dispersion due to the λ/4 plate.

11 Claims, 9 Drawing Sheets

TRANSFLECTIVE TYPE LIQUID CRYSTAL DISPLAY DEVICE

This application is the U.S. national phase of International Application No. PCT/JP2007/070414, filed 19 Oct. 2007, which designated the U.S. and claims priority to Japanese Patent Application No. 2007-034078, filed 14 Feb. 2007, the entire contents of each of which are hereby incorporated by reference.

TECHNICAL FIELD

The present invention relates to a transflective type liquid crystal display device for displaying an image through both a reflective display region and a transmissive display region.

BACKGROUND ART

Nowadays, liquid crystal display devices are broadly used in electronics devices such as monitors, projectors, mobile phones, and personal digital assistants (PDA). Such liquid crystal display devices can be classified into three types: a reflective type, a transmissive type, and a transflective type.

A transflective type liquid crystal display device performs transmissive display by utilizing light from a backlight under a condition of relatively dark illumination, for example, indoors, whereas performing reflective display with use of illumination light under a condition of relatively bright illumination, for example, outdoors. This feature makes it possible to accomplish a high-contrast-ratio display regardless of surrounding brightness. That is, the transflective type liquid crystal display device can perform display under any illumination condition (in any light environment), both indoors and outdoors. Therefore, the transflective type liquid crystal display devices have been broadly provided in mobile devices such as mobile phones, PDAs, and digital cameras.

A liquid crystal panel of such a transflective type liquid crystal display device includes two types of display regions including a reflective region (reflective display region) used for a reflection mode and a transmissive region (transmissive display region) used for a transmission mode.

In a standard transflective type liquid crystal display device, a λ/4 wavelength plate (hereinafter, simply referred to as λ/4 plate) needs to be provided on a front side (a side from which external light enters) of a liquid crystal layer so that a reflective display region can perform precise black and white display (See [Background Art] of Patent Literature 1, for example). Moreover, in a transmissive display region, another λ/4 plate needs to be provided on a back side of the liquid crystal layer so that an influence of the λ/4 plate provided on the front side of the liquid crystal layer is cancelled.

Furthermore, if the λ/4 plate were a perfectly ideal one, the plate would cause no problem. In general, however, characteristics of the λ/4 plate vary in accordance with wavelengths, and wavelength dispersion occurs. This results in a change in a tinge (chromaticity) in the reflective display region. The change in a tinge indicates, for example, a case where black is displayed as black tinged with blue and a case where white is displayed as white tinged with yellow.

Patent Literature 1 discloses a technique for correcting such a change in a tinge. In a configuration of the technique, two polarization plates are provided so as to sandwich a liquid crystal layer and phase difference compensation means (λ/2 plate) is provided between each of the polarization plates and the liquid crystal layer. This corrects such a tinge.

Moreover, Patent Literature 2 discloses a technique for compensating, by providing an optical thin film on a reflective electrode, a tinge of yellow in a liquid crystal layer in a reflective type or transflective type liquid crystal display device. Furthermore, the following configuration is disclosed in Patent Literature 3. In the configuration, a liquid crystal display device having a reflection function includes a first electrode formed from a thin film electrode that is formed from a transparent material directly covering the reflective layer. This is for the purpose of allowing the first electrode and a second electrode sandwiching the liquid crystal layer to have the same characteristics. In this configuration, a tint of a reflective display and reduction in reflectance in reflective display can be prevented by changing a thickness of the thin film electrode.

As described above, various studies are made for a technique for preventing a tint of a reflective display, in a liquid crystal display device having a reflection function.

Citation List

Patent Literature 1

Japanese Patent Application Publication, Tokukai, No. 2003-149636 A (Publication Date: May 21, 2003)

Patent Literature 2

Japanese Patent Application Publication, Tokukai, No. 2001-66585 A (Publication Date: Mar. 16, 2001)

Patent Literature 3

Japanese Patent Application Publication, Tokukai, No. 2003-255378 A (Publication Date: Sep. 10, 2003)

SUMMARY OF INVENTION

Regarding a transflective type liquid crystal display device having both a reflective display function and a transmissive display function, there is a significant problem to be solved. The problem is how to maintain display quality of transmissive display in addition to improving display quality of reflective display by preventing a tint in the reflective display.

However, in the techniques of the Patent Literatures, only improvement of display quality in reflective display is studied. However, display quality in transmissive display is not considered. That is, by increasing the number of wave plates, for example, by additionally providing a λ/2 plate, deterioration in contrast occurs in a transmissive display region though a tinge in a reflective display region can be corrected.

Regarding this problem, an explanation is made as follows with reference to a liquid crystal display device of Patent Literature 1 as an example. In the liquid crystal display device of Patent Literature 1, two polarization plates are provided so as to sandwich a liquid crystal layer. Further, two types of wave plates are provided between the liquid crystal layer and each of the polarization plates. The two types of wave plates are: (i) wave plates for performing reflective display and (ii) λ/2 plates for correcting a tint in reflective display. That is, the liquid crystal display device includes six optical films in total including the two polarization plates and the four wave plates.

In the liquid crystal display device of the above mentioned configuration, transmissive display is performed through all of the optical films. In this case, phase difference values and arrangement angles vary to some extent among the wave plates. This leads to remarkable deterioration in contrast particularly in transmissive display.

The present invention is achieved in view of the above problems. An object of the present invention is to provide a transflective type liquid crystal display device in which, though no wave plate for chromaticity correction is used, a tint in a reflective display region can be prevented, and thereby reduction in contrast in a transmissive display region can be prevented.

In order to achieve the object, a transflective type liquid crystal display device of the present invention includes: a liquid crystal panel displaying an image through both a reflective display region and a transmissive display region, wherein: the liquid crystal panel includes (i) a reflective electrode for reflecting incident external light and (ii) a wave plate for performing reflective display, the wave plate being provided on a side of a liquid crystal layer from which side external light enters the liquid crystal layer; and the reflective electrode is provided with a thin film for suppressing wavelength dispersion caused by the wave plate.

In the present specification, the "transflective type liquid crystal display device" indicates a liquid crystal display device which performs display by use of a transmissive mode and a reflective mode.

The transflective type liquid crystal display device of the present invention includes a wave plate such as a $\lambda/4$ plate on a side from which external light enters a liquid crystal layer (a front side of the liquid crystal layer) so that precise black and white display is performed in a reflective display region. Further, the transflective type liquid crystal display device of the present invention includes, on a reflective electrode, a thin film that prevents wavelength dispersion caused by the wave plate. The thin film can correct a change in chromaticity (for example, prevent a tinge of blue in displaying black, or, prevent a tinge of yellow in displaying white) in reflective display by preventing the wavelength dispersion. That is, the thin film corrects chromaticity in reflective display.

In the above configuration, no more wave plate such as a $\lambda/2$ plate needs to be provided in a transmissive display region, for correcting wavelength dispersion. Therefore, the transmissive display is not affected by a wave plate. This prevents reduction in contrast in the transmissive display region caused by adding a wave plate. With this configuration, a tint in a reflective display region due to wavelength dispersion can be prevented while reduction in contrast can be prevented in the transmissive display region.

In the transflective type liquid crystal display device of the present invention, a chromaticity-correction thin film is provided on a reflective electrode. In this configuration, the thin film affects a reflective region only, and does not affect a transmissive region. Therefore, reduction in contrast can be prevented in the transmissive region.

In the transflective type liquid crystal display device of the present invention, it is preferable that the thin film prevents reflective display from being tinged with blue in displaying black.

The above configuration prevents that reflective display is tinged with blue by wavelength dispersion due to the wave plate in displaying black. Note that, in order to prevent reflective display from being tinged with blue, the above thin film can be, for example, a thin film whose transmissivity at a blue wavelength (wavelength of 450 nm) is 97% or less in displaying black.

In the transflective type liquid crystal display device of the present invention, the thin film may be formed from a material selected from a group including IZO, ITO, MoN, $SiO_2$, and silicon nitride.

In the transflective type liquid crystal display device of the present invention, it is preferable that the reflective electrode is formed from Al; and the thin film is formed from IZO or MoN.

In the above configuration, the reflective electrode formed from Al and the thin film formed from the above material can be simultaneously etched by use of an etching solution obtained by mixing nitric acid, phosphoric acid, acetic acid, and water (see Patent Literature 4: Japanese Patent Application Publication, Tokukai, No. 2005-316399 A (Publication Date: Nov. 10, 2005)). This feature leads to an advantageous effect in manufacturing processes. The advantageous effect is such that the reflective electrode and the thin film can be formed into a pattern simultaneously.

In the transflective type liquid crystal display device of the present invention, it is preferable that, when the thin film is formed from IZO, a thickness of the thin film is 100 Å to 300 Å.

In the above configuration, when the thin film is formed from IZO, a tint in reflective display can be prevented effectively by setting a thickness of the thin film to 100 Å or more. Moreover, reduction in light transmissivity in displaying white can be prevented by setting a thickness of the thin film to 300 Å or less.

In the transflective type liquid crystal display device of the present invention, it is preferable that, when the thin film is formed from MoN, a thickness of the thin film is 20 Å to 80 Å.

In the above configuration, when the thin film is formed from MoN, a tint in reflective display can be prevented effectively by setting a thickness of the thin film to 20 Å or more. Moreover, reduction in light transmissivity in displaying white can be prevented by setting a thickness of the thin film to 80 Å or less.

In the transflective type liquid crystal display device of the present invention, it is preferable that the wave plate is a $\lambda/4$ wavelength plate.

In the above configuration, precise black and white display can be performed in a reflective display region by providing a $\lambda/4$ wavelength plate ($\lambda/4$ plate).

It is preferable that the transflective type liquid crystal display device of the present invention further includes: another wave plate on another side of the liquid crystal layer, the another side being opposite from the side provided with the wave plate; and two polarization plates, wherein: from the side from which external light enters, one of the polarization plates, the wave plate, the liquid crystal layer, the another wave plate, and the other one of the polarization plates in this order are provided.

In this configuration, a phase difference caused in a transmissive display region due to a wave plate for performing reflective display can be cancelled by providing the another wave plate.

In the transflective type liquid crystal display device of the present invention, it is preferable that: the wave plate is a $\lambda/4$ wavelength plate; and the polarization plate and the $\lambda/4$ wavelength plate that are provided on the side from which external light enters the liquid crystal layer are arranged so that a slow axis of the $\lambda/4$ wavelength plate is shifted by an angle of 45 degrees counterclockwise with respect to a polarized light absorption axis of the polarization plate.

With the above configuration, precise black and white display can be performed in reflective display.

In the transflective type liquid crystal display device of the present invention, it is preferable that slow axes of the wave plate and the another wave plate sandwiching the liquid crystal layer are arranged so as to be shifted from each other by an angle of 90 degrees when viewed from a same side of the liquid crystal layer; and polarized light absorption axes of the two polarization plates sandwiching the liquid crystal layer is arranged so as to be shifted by an angle of 90 degrees from each other when viewed from the same side of the liquid crystal layer.

In the above configuration, an influence of the wave plate provided on the front side (the wave plate provided on a side from which the external light enters a liquid crystal layer) in transmissive display can be cancelled by the wave plate provided on the back side.

In the above transflective type liquid crystal display device, a birefringent layer for correcting a viewing angle may be provided between one of the polarization plates and the wave plate and another birefringent layer for correcting a viewing angle may be provided between the another wave plate and the other one of the polarization plates.

In the above configuration, birefringent layers are provided. This makes it possible to improve a viewing angle of the liquid crystal display device.

For a fuller understanding of the nature and advantages of the invention, reference should be made to the ensuing detailed description taken in conjunction with the accompanying drawings.

BRIEF DESCRIPTION OF DRAWINGS

FIG. 1 is a cross-sectional view illustrating a configuration of a liquid crystal cell provided in a liquid crystal display device shown in FIG. 2.

FIG. 2 is a schematic view illustrating (i) a configuration of a liquid crystal display device according to an embodiment of the present invention, and (ii) examples of axis angles of polarization plates and wave plates provided in the liquid crystal display device. (a) schematically illustrates a configuration of the liquid crystal display device according to the embodiment of the present invention. (b) illustrates examples of axis angles of a polarization plate and a wave plate provided on a front side of a liquid crystal cell in the liquid crystal display device of (a). (c) illustrates examples of axis angles of a polarization plate and a wave plate that are provided on a back side of the liquid crystal cell in the liquid crystal display device of (a).

FIG. 3 is a schematic view illustrating (i) a first conventional configuration of a liquid crystal display device, and (ii) examples of axis angles of polarization plates and wave plates provided in the liquid crystal display device. (a) illustrates a first conventional configuration of the liquid crystal display device. (b) illustrates examples of axis angles of a polarization plate and a wave plate provided on a front side of a liquid crystal cell in the liquid crystal display device of (a). (c) illustrates examples of axis angles of a polarization plate and a wave plate provided on a back side of the liquid crystal cell in the liquid crystal display device of (a).

FIG. 4 is a schematic view illustrating (i) a second conventional configuration of a liquid crystal display device, and (ii) examples of axis angles of a polarization plate and wave plates provided in the liquid crystal display device. (a) illustrates a second conventional configuration of the liquid crystal display device. (b) illustrates examples of axis angles of a polarization plate and a wave plate provided on a front side of a liquid crystal cell in the liquid crystal display device of (a). (c) illustrates examples of axis angles of a polarization plate and a wave plate provided on a back side of the liquid crystal cell in the liquid crystal display device of (a).

FIG. 5 is a graph illustrating reflection spectra that are respectively obtained when black display is performed by liquid crystal display devices. (a) and (b) are graphs illustrating reflection spectra that are obtained when black display is performed by the liquid crystal display device of the present invention shown in (a) of FIG. 2. Note that: (a) shows a case where a chromaticity-correction thin film is formed from IZO; and (b) shows a case where a chromaticity-correction thin film is formed from MoN. (c) is a graph illustrating a reflection spectrum that is obtained when black display is performed by a liquid crystal display device of a conventional configuration.

FIG. 6 is a graph illustrating reflection spectra of a reflective electrode. Note that: (a) shows a case where a chromaticity-correction thin film is formed from IZO; and (b) shows a case where a chromaticity-correction thin film is formed from MoN.

FIG. 7 is a schematic view illustrating a measuring method for chromaticity in reflective display of a liquid crystal display device.

FIG. 8 is a schematic view illustrating a measuring method for contrast in transmissive display of a liquid crystal display device.

FIG. 9 is a schematic view illustrating (i) a configuration of a liquid crystal display device according to another embodiment of the present invention, and (ii) axis angles of polarization plates and wave plates provided in the liquid crystal display device. (a) illustrates a schematic configuration of a liquid crystal display device in another embodiment of the present invention. (b) illustrates axis angles of a polarization plate and a wave plate provided on a front side of a liquid crystal cell in the liquid crystal display device of (a). (c) illustrates axis angles of a polarization plate and a wave plate provided on a back side of the liquid crystal cell in the liquid crystal display device of (a).

FIG. 10 is a schematic view illustrating (i) a third, conventional configuration of a liquid crystal display device, and (ii) examples of axis angles of polarization plates and wave plates provided in the liquid crystal display device. (a) illustrates the third conventional configuration of the liquid crystal display device. (b) illustrates an example of axis angles of a polarization plate and a wave plate provided on a front side of a liquid crystal cell in the liquid crystal display device of (a). (c) illustrates an example of axis angles of a polarization plate and a wave plate provided on a back side of the liquid crystal cell in the liquid crystal display device of (a).

| | Reference Signs List |
|---|---|
| 10: | Liquid Crystal Cell |
| 13: | Liquid Crystal Layer |
| 32: | Reflective Electrode |
| 33: | Chromaticity-Correction Thin Film (Thin Film) |
| A: | Reflective Display (Region) |
| B: | Transmissive Display (Region) |
| a: | Reflective Region |
| b: | Transmissive Region |
| 40: | Liquid Crystal Panel (Present Embodiment) |
| 40a: | Liquid Crystal Panel (Another Embodiment) |
| 41a: | Front-Side λ/4 plate (Wave Plate for Reflective Display) |
| 41b: | Back-Side λ/4 plate |
| 43a: | Front-Side Polarization Plate |
| 43b: | Back-Side Polarization Plate |
| 50: | Backlight |
| 40b: | Liquid Crystal Panel (First Conventional Configuration) |
| 40c: | Liquid Crystal Panel (Second Conventional Configuration) |
| 40d: | Liquid Crystal Panel (Third Conventional Configuration) |
| 42a: | Front-Side λ/2 plate (Wave Plate for Chromaticity |

-continued

Reference Signs List

| | |
|---|---|
| | Correction) |
| 42b: | Back-Side λ/2 plate |
| 45a: | Front-Side Birefringent Layer (Birefringent Layer) |
| 45b: | Back-Side Birefringent Layer (Birefringent Layer) |

DESCRIPTION OF EMBODIMENTS

One embodiment of the present invention is explained below with reference to the attached drawings. Note that the present invention is not limited by the embodiment explained below.

A liquid crystal display device of the present embodiment is a transflective type liquid crystal display device for displaying an image through both a reflective display region and a transmissive display region. That is, under relatively dark illumination, for example, indoors, the liquid crystal display device of the present embodiment displays an image by transmissive display mainly with the use of light of a backlight. On the other hand, under relatively bright illumination, for example, outdoors, the liquid crystal display device displays an image by reflective display with the use of ambient light while turning off the backlight.

First, a configuration of a liquid crystal display device of the present embodiment is explained.

Figure 2:
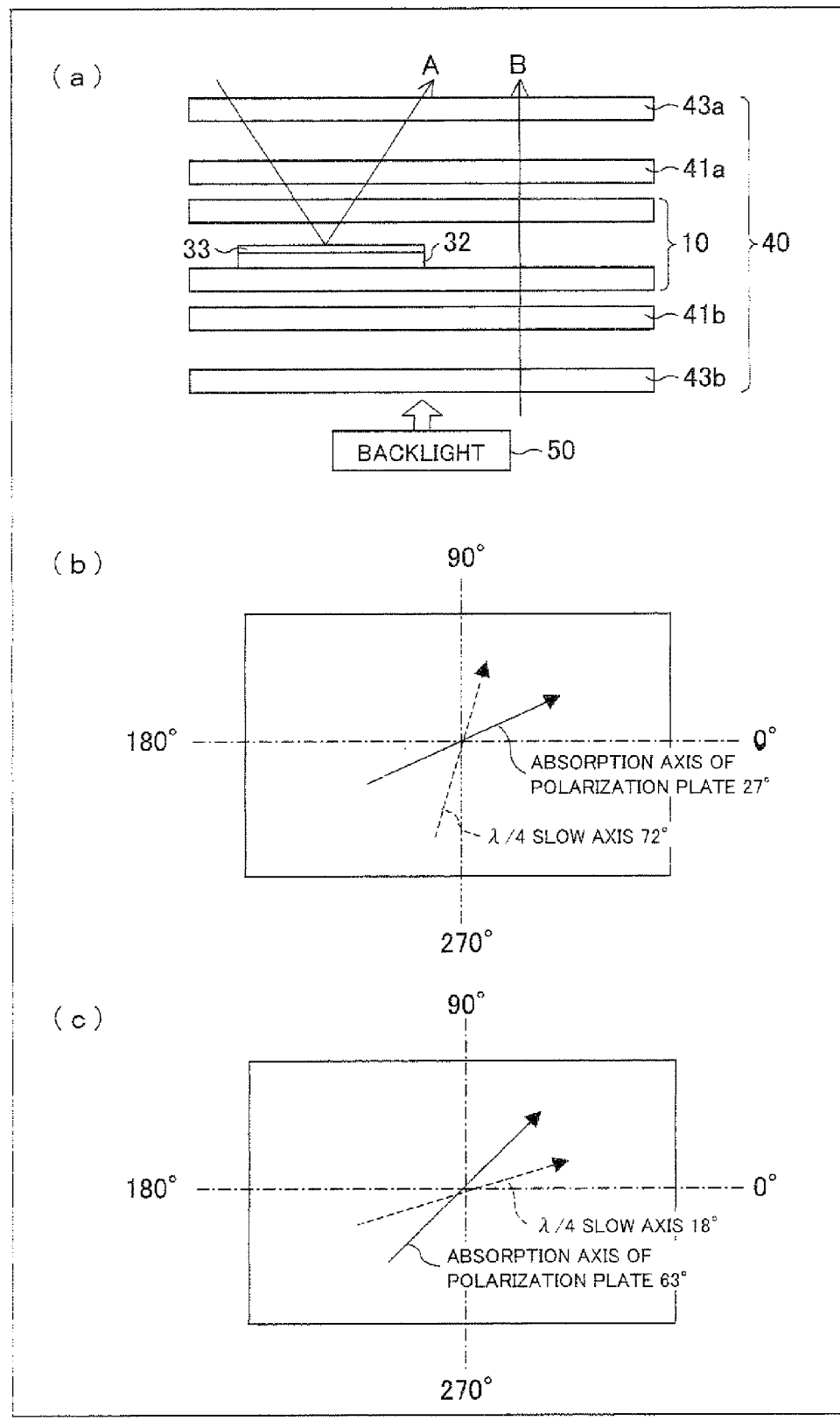
FIG. 2

(a) of FIG. 2 shows a schematic configuration of the liquid crystal display device. As shown in (a) of FIG. 2, the liquid crystal display device includes a backlight 50 on one side (referred to as a back side) of a liquid crystal panel 40. In the liquid crystal panel 40, a liquid crystal cell 10 including a liquid crystal layer is provided between a front-side polarization plate 43a and a back-side polarization plate 43b. Here, the "front side" indicates a side from which external light enters the liquid crystal cell 10, and the "back side" indicates a side where the backlight is provided.

Further, a front-side λ/4 plate 41a is provided between the liquid crystal cell 10 and the front-side polarization plate 43a. The front-side λ/4 plate 41a is a wave plate provided for performing reflective display. In addition, a back-side λ/4 plate 41b (another wave plate) is provided, as another wave plate, between the liquid crystal cell 10 and the back-side polarization plate 43b.

The λ/4 plates 41a and 41b change a polarization state of light passing through the λ/4 plates 41a and 41b. The polarization plates 43a and 43b allow only light of a specific polarized-light component to pass through the polarization plates 43a and 43b.

Reflective display is performed by reflecting incident external light on a reflective electrode 32 formed on a TFT substrate of the liquid crystal cell 10. Moreover, a chromaticity-correction thin film (thin film) 33 formed from a material such as IZO, MoN. ITO, or SiN is further formed on the reflective electrode 32. The chromaticity-correction thin film 33 is explained in detail later.

In the liquid crystal display device of the present embodiment, in a liquid crystal display mode of a vertical alignment system, for example, when the liquid crystal cell 10 is in a state where no voltage is applied, the external light that enters the front-side polarization plate 43a passes back and forth through the front-side λ/4 plate 41a and the liquid crystal layer of a phase difference of 0. As a result, due to the front-side λ/4 plate 41a, the light becomes linearly polarized light that is shifted by an angle of 90 degrees with respect to a transmission direction of the front-side polarization plate 43a. Therefore, the light cannot pass through the front-side polarization plate 43a. This results in black display. On the other hand, in a case where the liquid crystal cell 10 is in a state where a voltage is applied, external light that enters the front-side polarization plate 43a passes back and forth through the front-side λ/4 plate 41a and the liquid crystal layer of a phase difference of λ/4. As a result, the light becomes linearly polarized light in parallel with a transmission direction of the front-side polarization plate 43a. Therefore, the light passes through the front side polarization plate 43a. This results in white display. As described above, precise black and white display can be performed in the reflective display region by providing the front-side λ/4 plate 41a.

In a region having no reflective electrode 32, transmissive display is performed by light emitted from the backlight 50 provided on the back side of the liquid crystal cell 10. Note that the back-side λ/4 plate 41b is provided in order to cancel an influence of the front-side λ/4 plate 41a on a phase difference (i.e. for restoring the altered polarization state) in transmissive display.

With the above configuration, the liquid crystal display device of the present embodiment can display an image in both reflective display A and transmissive display B.

(b) of FIG. 2 illustrates axis angles of the front-side polarization plate 43a and the front-side λ/4 plate 41a provided in the liquid crystal panel 40 in (a) of FIG. 2 (Note that: a right hand of (b) of FIG. 2 viewed from front is regarded as 0 degree as a basic angle, and each axis angle indicates an angle counterclockwise from the basic angle). As shown in (b) of FIG. 2, a polarized-light absorption axis of the front-side polarization plate 43a is at an angle of 27 degrees, and a slow axis of the front-side λ/4 plate 41a is at an angle of 72 degrees. As described above, the slow axis of the front-side λ/4 plate 41a is arranged by rotating by 45 degrees the polarized-light absorption axis of the front-side polarization plate 43a. With this arrangement, precise black and white display can be performed in reflective display.

Moreover, (c) of FIG. 2 illustrates axis angles of the back-side polarization plate 43b and the back-side λ/4 plate 41b provided in the liquid crystal panel 40 in (a) of FIG. 2 (Note that: a right hand of (c) of FIG. 2 viewed from front is regarded as 0 degree as a basic angle, and each axis angle indicates an angle counterclockwise from the basic angle). As shown in (c) of FIG. 2, a polarized-light absorption axis of the back-side polarization plate 43b is at an angle of 63 degrees, and a slow axis of the back-side λ/4 plate 41b is at an angle of 18 degrees. As described above, the slow axis of the back-side λ/4 plate 41b is arranged by rotating by −45 degrees the polarized-light absorption axis of the back-side polarization plate 43b.

Note that an optical axis of each of the polarization plates and the wave plates respectively shown in (b) of FIG. 2 and (c) of FIG. 2 is at an axis angle on a surface of each plate. That is, regarding the front-side polarization plate and wave plate shown in (b) of FIG. 2, the axis angles indicate angles that are obtained when the liquid crystal panel 40 is viewed on a display-face side, whereas, regarding the back-side polarization plate and wave plate shown in (c) of FIG. 2, the axis angles indicate angles that are obtained when the liquid crystal panel 40 is viewed on a backlight side. In a case where the plates on front and back sides are viewed on the same side of the liquid crystal panel 40, the polarized-light absorption axis of the front-side polarization plate 43a is shifted by 90 degrees from the polarized-light absorption axis of the back-side polarization plate 43b. Similarly, the slow axis of the front-side λ/4 plate 41a is shifted by 90 degrees from the slow axis of the back-side λ/4 plate 41*b*. This makes it possible to cancel an influence of the front side λ/4 plate 41*a* on transmissive display.

Figure 1:
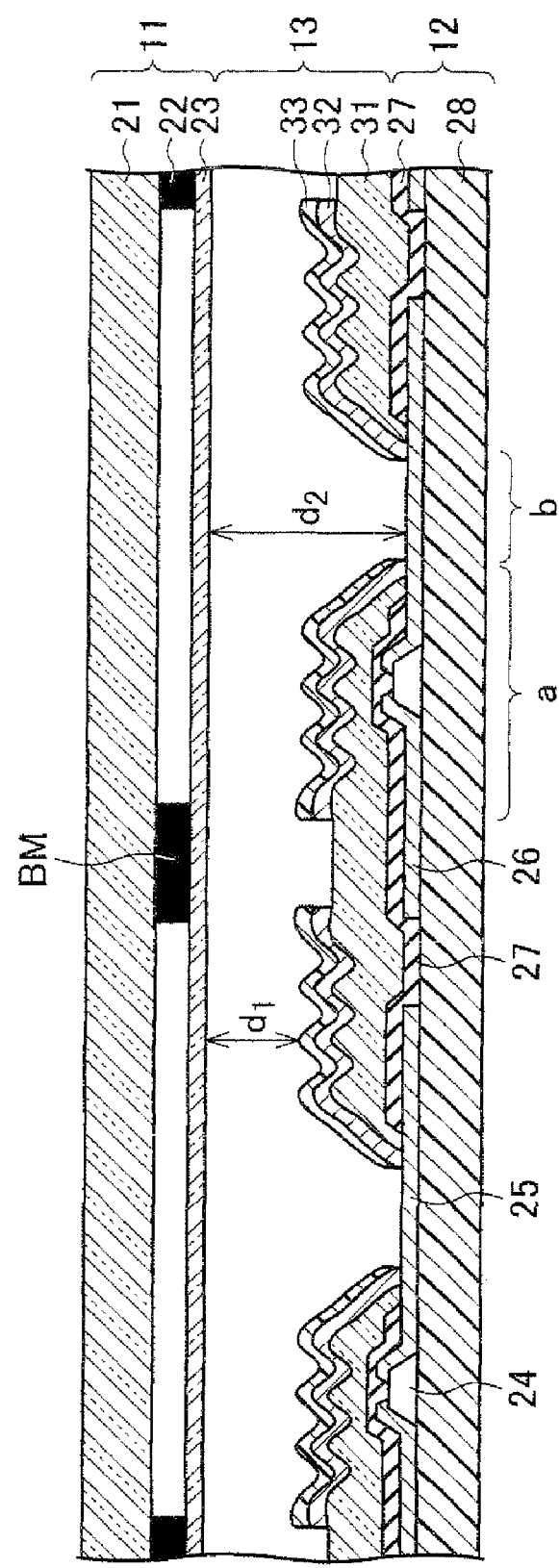
FIG. 1

Next, a configuration of the liquid crystal cell 10 is explained more specifically with reference to FIG. 1. As shown in FIG. 1, the liquid crystal cell 10 has a liquid crystal layer 13 sandwiched between a counter substrate 11 and a TFT substrate 12.

The counter substrate 11 includes a color filter 22 on an inner side with respect to a glass substrate 21, and further includes an ITO film 23 on an inner side with respect to the color filter 22.

The color filter 22 selects a color of light passing through the color filter 22. That is, the color filter 22 includes three-filter sets each including a red (R) filter, a blue (B) filter, and a green (G) filter. One of the three filters is provided in every set of a reflective region a and a transmissive region b. Each of the filters R, B, and G only transmits corresponding one of a red component, a blue component, and a green component of incident light.

Moreover, the color filter 22 is made of the same color material in both the reflective region a and the transmissive region b. Further, a thickness of the color filter 22 is substantially the same in the both regions a and b. A black matrix BM is provided in the color filter 22 on a section that corresponds to a boundary of pixels.

In the present liquid crystal display device, one pixel region indicates a section including the reflective region a and the transmissive region b shown in FIG. 1. Here, the reflective region a is a pixel region (reflective display region) used for reflective display, and the transmissive region b is a pixel region (transmissive display region) used for transmissive display.

Note that, in the present embodiment, the same color filter is used in the reflective region a and the transmissive region b. However, the present invention is not limited to such a configuration. It is possible to provide color filters exclusive to a reflective region and a transmissive region, respectively.

On the other hand, the TFT substrate 12 includes a TFT 24, a picture element electrode 25, a source signal line 26, an interlayer insulation film 27, and the like that are formed on a glass substrate 28 by patterning. On a part of the members having been subjected to patterning, a protrusion 31 is provided. The protrusion 31 is formed from transparent resin such as photosensitive acrylic resin and an organic insulation film. A reflective electrode 32 and a chromaticity-correction thin film 33 in this order are formed on the protrusion 31.

The reflective electrode 32 has a light reflection function, and made of metal such as Al and Mo. The reflective electrode 32 may have a laminated-layer structure including an Mo layer and an Al layer. Moreover, the chromaticity-correction thin film 33 is a thin film formed from IZO, MoN, ITO, SiNx, $SiO_2$, or the like.

The protrusion 31 is provided under the reflective electrode 32 in the reflective region a, and serves as a base for formation of the reflective electrode 32. Moreover, in the liquid crystal display device of the present embodiment, a thickness (cell thickness) of the liquid crystal layer 13 corresponding to the reflective region a is changed by the protrusion 31 from a thickness (cell thickness) of the liquid crystal layer 13 corresponding to the transmissive region b.

The chromaticity-correction thin film 33 controls wavelength dispersion caused by the front-side λ/4 plate 41*a*. This prevents a tint in reflective display that is caused by wavelength dispersion due to the front-side λ/4 plate 41*a*. Consequently, black display tinged with blue can be prevented. In the liquid crystal display device of the present embodiment, the chromaticity-correction thin film 33 is not formed in the transmissive region b. The chromaticity-correction thin film 33 is formed only in the reflective region a (i.e. a region in which the reflective electrode 32 is formed). With this configuration, a tint in reflective display can be prevented, while deterioration in contrast does not occur in transmissive display.

Figure 3:
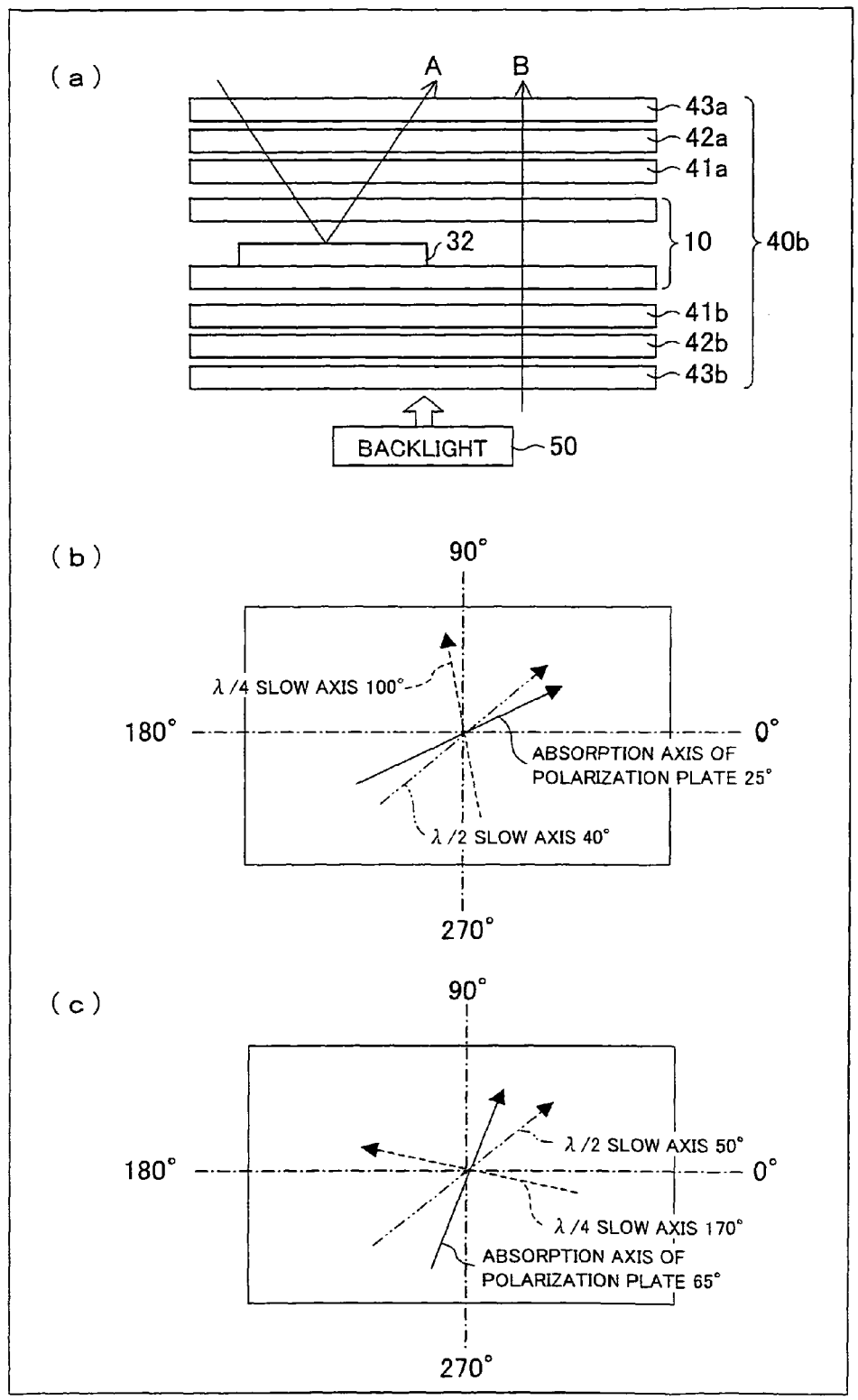
FIG. 3
Figure 4:
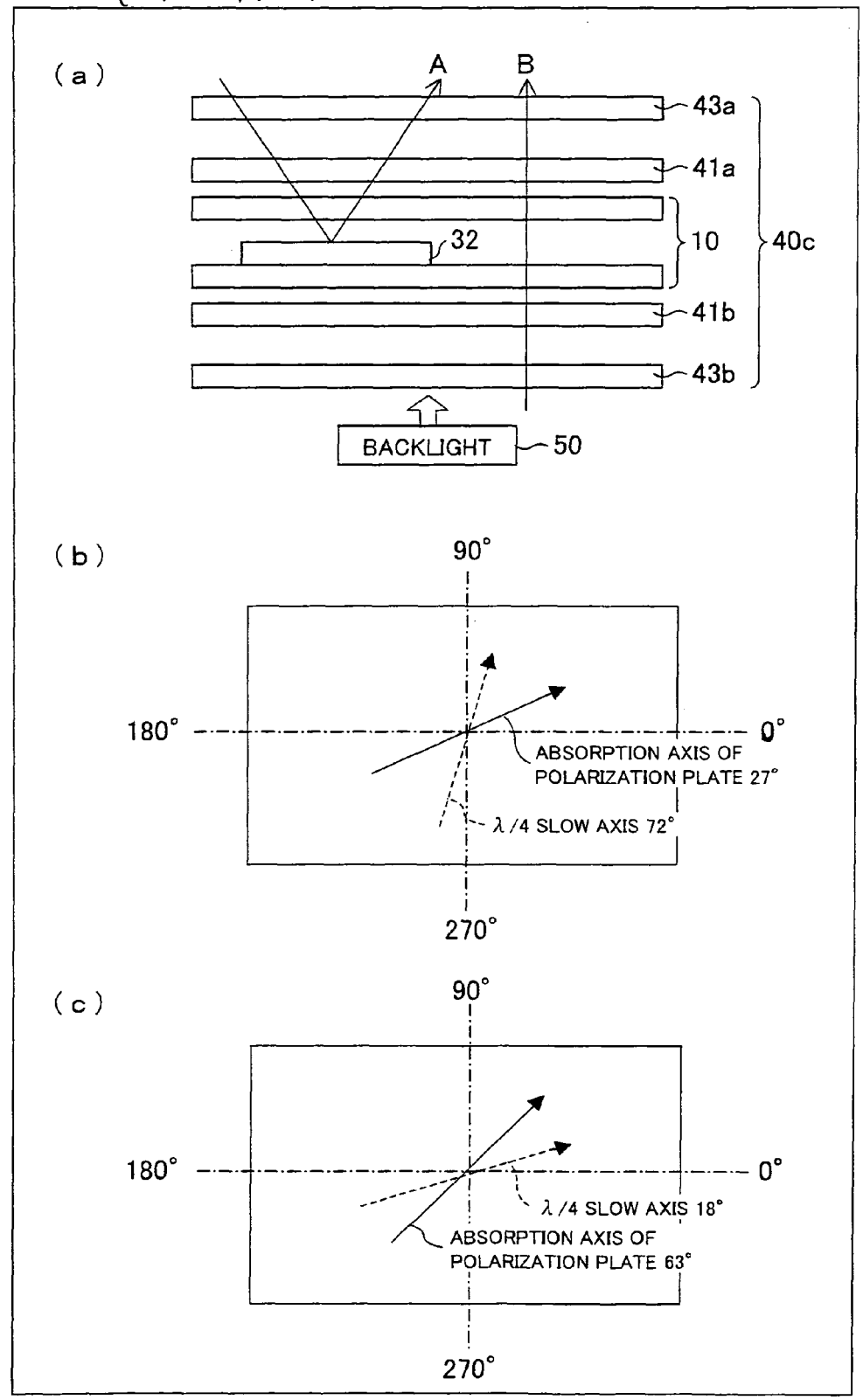
FIG. 4

Regarding this point, for a comparison, a configuration of a conventional transflective type liquid crystal display device is explained. (a) of FIG. 3 illustrates a first conventional configuration. (a) of FIG. 4 illustrates a second conventional configuration. For convenience of explanation, in these drawings, members having the same functions as those of the liquid crystal display device of the present embodiment are given the same name and the same reference numerals, and explanations of the members are omitted.

A liquid crystal panel 40*b* provided in a liquid crystal display device shown in (a) of FIG. 3 includes a front-side λ/2 plate 42*a* between a front-side polarization plate 43*a* and a front-side λ/4 plate 41*a*, for the purpose of correcting a tint that occurs, in reflective display, due to the front-side λ/4 plate 41*a* provided. Moreover, the liquid crystal panel 40*b* is further provided with a back-side λ/2 plate 42*b* between a back-side polarization plate 43*b* and a back-side λ/4 plate 41*b*, for the purpose of canceling an influence of the front-side λ/2 plate 42*a* on phase difference (i.e. for the purpose of restoring the altered polarization state) in the transmissive display.

As described above, in the first conventional configuration, λ/2 plates are provided instead of a chromaticity-correction thin film formed on a reflective electrode.

(b) of FIG. 3 illustrates axis angles of the front-side polarization plate 43*a*, the front-side λ/2 plate 42*a*, and the front-side λ/4 plate 41*a* provided in the liquid crystal panel 40*b* of (a) of FIG. 3 (Note that: a right hand of (b) of FIG. 3 viewed from front is regarded as 0 degree as a basic angle, and each axis angle indicates an angle counterclockwise from the basic angle).

Moreover, (c) of FIG. 3 illustrates axis angles of the back-side polarization plate 43*b*, the back-side λ/2 plate 42*b*, and the back-side λ/4 plate 41*b* provided in the liquid crystal panel 40*b* of (a) of FIG. 3 (Note that: a right hand of the (c) of FIG. 3 viewed from front is regarded as 0 degree as a basic angle, and each axis angle indicates an angle counterclockwise from the basic angle). As shown in (c) of FIG. 3, a polarized-light absorption axis of the back-side polarization plate 43*b* is at an angle of 65 degrees. A slow axis of the back-side λ/4 plate 41*b* is at an angle of 170 degrees, and a slow axis of the back-side λ/2 plate 42*b* is at an angle of 50 degrees. As just described, the slow axes of the back-side λ/4 plate 41*b* and the back-side λ/2 plate 42*b* are arranged so that (i) a direction in which the slow axis of the back-side λ/4 plate 41*b* is shifted from the polarized-light absorption axis of the back-side polarization plate 43*b* is opposite to a direction in which the slow axis of the front-side λ/4 plate 41*a* is shifted from the polarized-light absorption axis of the front-side polarization plate 43*a* and (ii) a direction in which the slow axis of the back-side λ/2 plate 42*b* is shifted from the polarized-light absorption axis of the back-side polarization plate 43*b* is opposite to a direction in which the slow axis of the front-side λ/2 plate 42*a* is shifted from the polarized-light absorption axis of the front-side polarization plate 43*a*.

Note that optical axes of the polarization plates and the wave plates shown in (b) of FIG. 3 and (c) of FIG. 3 are shown at axis angles on respective surfaces of the plates. That is, in the front-side polarization plate and wave plate shown in (b) of FIG. 3, the axis angles indicate angles that are obtained when the liquid crystal panel 40*b* is viewed on a display-face side, whereas, in the back-side polarization plate and wave plate shown in (c) of FIG. 3, the axis angles indicate angles that are obtained when the liquid crystal panel 40b is viewed on a backlight side. Therefore, on condition that the front-side plates and the back-side plates are viewed on the same side of the liquid crystal display panel 40b, the front-side absorption axis and slow axes are shifted by 90 degrees from the back-side absorption axis and slow axes, respectively. With this configuration, an influence of the front-side λ/4 plate 41a on transmissive display can be cancelled. Note that the absorption axes and the slow axes are arranged so that wavelength dispersion can be optimized. Therefore, the absorption axis and the slow axis do not necessarily make an angle of 45 degrees in the configuration shown in (b) of FIG. 3 and (e) of FIG. 3.

A liquid crystal display device provided with a liquid crystal panel 40c shown in (a) of FIG. 4 is an example of a transflective type liquid crystal display device that does not have a member for making it possible to correct a tint in reflective display. That is, the second conventional configuration includes neither a chromaticity-correction thin film nor a λ/2 plate.

(b) of FIG. 4 illustrates axis angles of the front-side polarization plate 43a and the front-side λ/4 plate 41a provided in the liquid crystal panel 40c in (a) of FIG. 4 (Note that: a right hand of the (b) of FIG. 4 viewed from front is regarded as 0 degree as a basic angle, and each axis angle indicates an angle counterclockwise from the basic angle).

Moreover, (c) of FIG. 4 illustrates axis angles of the back-side polarization plate 43b and the back-side λ/4 plate 41b provided in the liquid crystal panel 40c in (a) of FIG. 4 (Note that: a right hand of the (c) of FIG. 4 viewed from front is regarded as 0 degree as a basic angle, and each axis angle indicates an angle counterclockwise from the basic angle).

The polarization plates and the wave plates in the liquid crystal panel 40c of the second conventional configuration are the same as those of the liquid crystal panel 40 of the present embodiment.

The following provides measured results of reflective chromaticity and transmissive contrast of each of the liquid crystal panel 40 of the present embodiment, the liquid crystal panel 40b of the first conventional configuration, and the liquid crystal panel 40c of the second conventional configuration.

Figure 7:
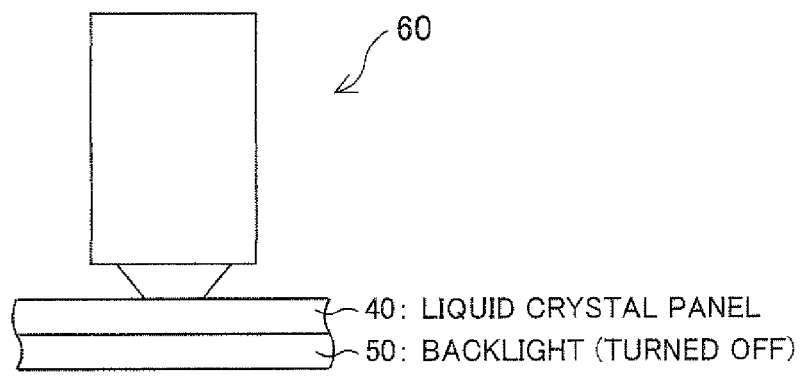
FIG. 7

First, a measuring method is explained with reference to FIG. 7 and FIG. 8. FIG. 7 illustrates a state in measuring reflective chromaticity. As shown in FIG. 7, the reflective chromaticity was measured, in a state where a backlight of the liquid crystal display device was turned off and CM-2002 (manufactured by MINOLTA, measurement mode: SCE mode) was used as a chromaticity measuring device 60.

Figure 8:
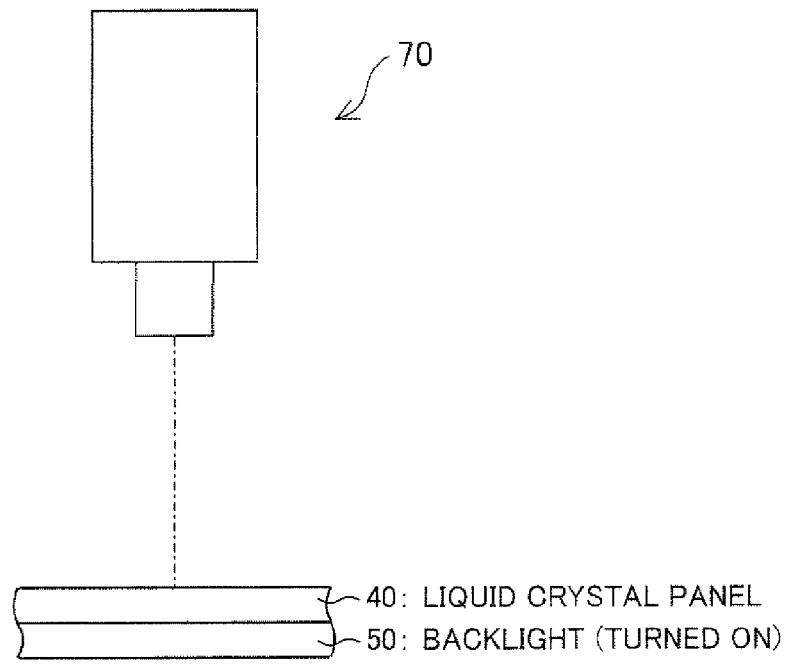
FIG. 8

FIG. 8 illustrates a state in measuring transmissive contrast. As shown in FIG. 8, transmissive contrast was measured in a state where a backlight of the liquid crystal display device was turned on and BM-5 (manufactured by TOPCON, measurement mode: light receiving angle 1 degree) was used as a contrast measuring device 70.

Regarding each of the liquid crystal display devices used in the measurement experiment, a birefringence ratio Δn of a liquid crystal was 0.098. Further, a cell thickness d1 of the liquid crystal cell in the reflective region a was 1.7 μm, and a cell thickness d2 of the liquid crystal cell in the transmissive region b was 3.4 μm.

Tables 1 to 3 show respective retardation values of members in each of the liquid crystal panels used in the experiment. Table 1 shows respective retardation values of the members of the liquid crystal panel 40.

TABLE 1

| Panel Members | Retardation Value (d · Δn) |
|---|---|
| Polarization Plate | — |
| λ/4 plate | 140 nm |
| Liquid Crystal Cell | Reflection: 170 nm   Transmission: 330 nm |
| λ/4 plate | 140 nm |
| Polarization Plate | — |

Table 2 shows respective retardation values of the members of the liquid crystal panel 40b.

TABLE 2

| Panel Members | Retardation Value (d · Δn) |
|---|---|
| Polarization Plate | — |
| λ/2 plate | 270 nm |
| λ/4 plate | 140 nm |
| Liquid Crystal Cell | Reflection: 170 nm   Transmission: 330 nm |
| λ/4 plate | 140 nm |
| λ/2 plate | 270 nm |
| Polarization Plate | — |

Table 3 shows retardation values of members of the liquid crystal panel 40c.

TABLE 3

| Panel Members | Retardation Value (d · Δn) |
|---|---|
| Polarization Plate | — |
| λ/4 plate | 140 nm |
| Liquid Crystal Cell | Reflection: 170 nm   Transmission: 330 nm |
| λ/4 plate | 140 nm |
| Polarization Plate | — |

Figure 5:
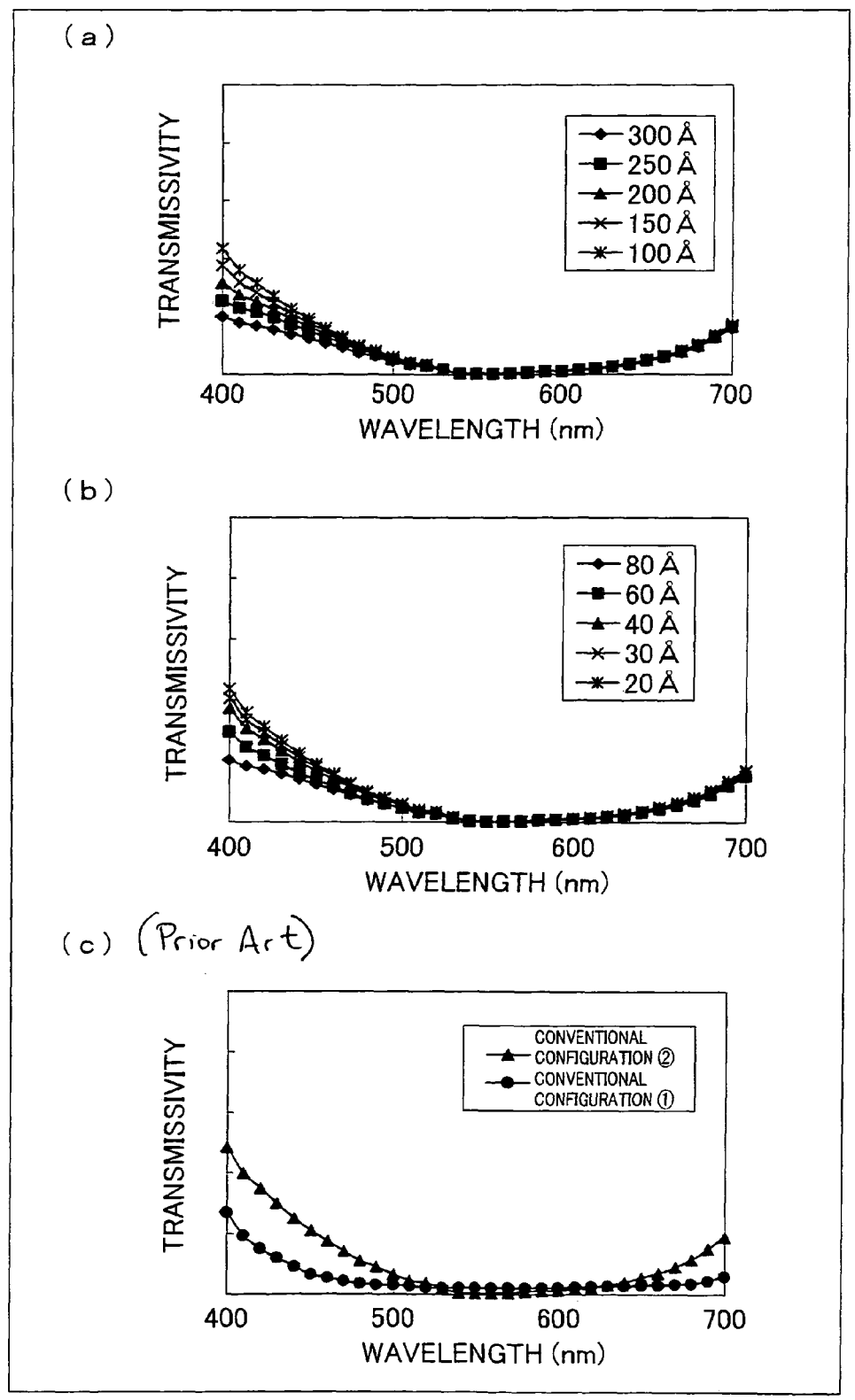
FIG. 5

(a) of FIG. 5 to (c) of FIG. 5 show measurement results of reflective chromaticity. (a) of FIG. 5 and (b) of FIG. 5 are graphs showing measurement results of chromaticity of reflected light (i.e. spectral characteristics in black display) at the time when the liquid crystal display device of the present invention shown in (a) of FIG. 2 performed black display. (c) of FIG. 5 is a graph showing measurement results of chromaticity of reflected light at the time when each of the liquid crystal displays of the conventional configurations performed black display. Note that (a) of FIG. 5 shows a case where chromaticity-correction thin films were formed from IZO so as to have various film thicknesses. (b) of FIG. 5 shows a case where chromaticity-correction thin films were formed from MoN so as to have various film thicknesses.

Figure 6:
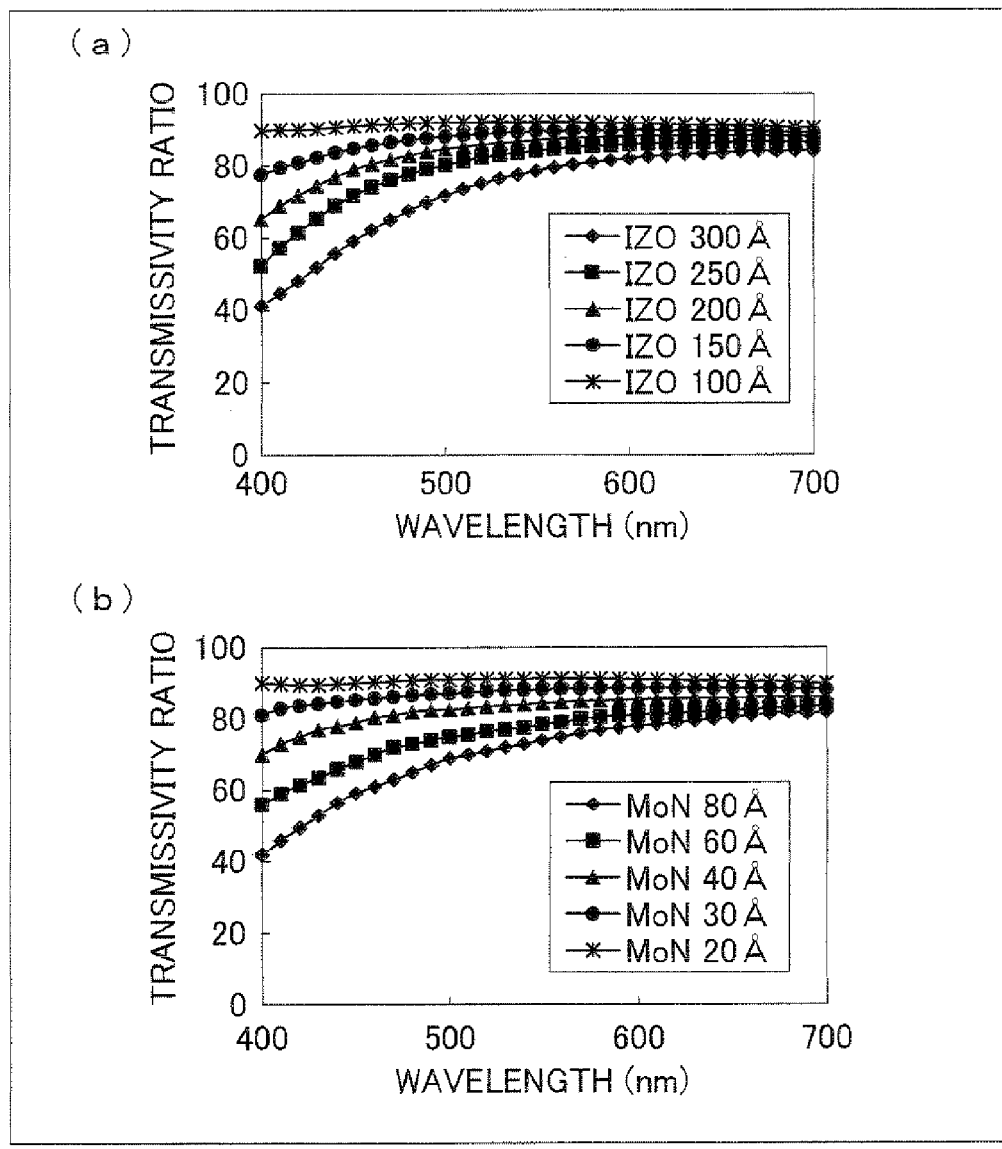
FIG. 6

Moreover, (a) of FIG. 6 and (b) of FIG. 6 show reflection spectra of reflective electrodes themselves at the time when the thin films were provided on the reflective electrodes in the liquid crystal panels corresponding to the liquid crystal panels of (a) of FIG. 5 and (b) of FIG. 5, respectively.

First, the first conventional configuration and the second conventional configuration shown in (c) of FIG. 5 are compared. The comparison shows that transmissivity of blue light around a wavelength of 400 nm is not reduced sufficiently in the second conventional configuration that does not include a member for chromaticity correction, compared to that in the first conventional configuration which has a chromaticity-correction λ/2 plate. This leads to black display tinged with blue in the second conventional display. On the other hand, because the first conventional configuration includes the chromaticity-correction λ/2 plate, a transmissivity of blue light around a wavelength of 450 nm (in a range of 400 nm to 500 nm) can be reduced to a low level in the first conventional configuration. This prevents a tint in reflective display.

It is clear from the above results that, if the same results as the first conventional configuration is obtained in the liquid crystal display device of the present embodiment, a tint caused by the λ/4 plate can be prevented effectively.

Next, a case where a chromaticity-correction thin film 33 formed from IZO is provided on a reflective electrode 32 is considered. As shown in (a) of FIG. 5, light transmissivity at a wavelength in a range of 400 nm to 500 nm can be reduced, compared to the second conventional configuration, by forming an IZO film on a reflective electrode. This configuration can prevent black display from being tinged with blue in the reflective region.

Note that, as shown in (a) of FIG. 5, in a case where a thickness of an IZO film is 100 Å or more, the light transmissivity in the wavelength in the range of 400 nm to 500 nm can be suppressed effectively. Moreover, as shown in (a) of FIG. 6, in a case where a thickness of an IZO film is 300 Å or less, deterioration in light transmissivity can be suppressed in an entire wavelength region of visible light in white display. From this characteristic, it is preferable that, in a case where a chromaticity-correction thin film 33 is formed from IZO, a film thickness is in a range of 100 Å to 300 Å.

Next, the following deals with a case where a chromaticity-correction thin film 33 formed from MoN is provided on a reflective electrode 32. As shown in (b) of FIG. 5, light transmissivity at a wavelength in a range of 400 nm to 500 nm can be reduced compared to that of the second conventional configuration, by forming a MoN film on a reflective electrode. This configuration can prevent a black display from being tinged with blue in a reflective region.

Note that, as shown in (b) of FIG. 5, when a thickness of the MoN film is 20 Å or more, light transmissivity at a wavelength in a range of 400 to 500 nm can be controlled effectively. Moreover, as shown in (b) of FIG. 6, when a thickness of the MoN film is 80 Å or less, deterioration in light transmissivity in white display can be prevented in an entire wavelength region of visible light. From this characteristic, in a case where the chromaticity-correction thin film 33 is formed from MoN, it is preferable that a film thickness is in a range of 20 Å to 80 Å.

Note that the thickness of the thin film above is merely an example of the present invention. A thickness of the chromaticity-correction thin film of the present invention is not limited to the above range. A preferable range of a film thickness can be defined by another method. For example, a thickness of the chromaticity-correction thin film can be set so that light transmissivity becomes 97% or less at a wavelength of 450 nm in displaying black in a reflective display region. However, as long as blue light transmissivity is decreased in any way, an effect of chromaticity correction can be obtained. Therefore, the present invention is not necessarily limited to the embodiment as described above.

Next, measurement results of transmissive contrast are shown in Table 4.

TABLE 4

|  |  | Conventional Configuration 1 | Conventional Configuration 2 | Present Invention |
|---|---|---|---|---|
| Contrast | Number of Samples | 20 | 20 | 20 |
|  | Average | 380 | 480 | 480 |
|  | Maximum | 510 | 570 | 590 |
|  | Minimum | 220 | 370 | 390 |

*IZO film thickness: 250 Å

Table 4 shows average values, maximum values, and minimum values of transmissive contrast as a result of measuring, by use of a contrast measuring device 70 shown in FIG. 8, transmissive contrast of 20 samples of each of liquid crystal display devices of the present embodiment (present invention), the first conventional configuration, and the second conventional configuration. Note that a liquid crystal display device having a chromaticity-correction thin film formed from IZO whose thickness was 250 Å was used as the liquid crystal display device of the present invention.

As shown in Table 4, in the first conventional configuration having the additional two λ/2 plates for preventing a tint in reflective display, the contrast was reduced more than that of the second conventional configuration. On the other hand, in the liquid crystal display device of the present invention having a chromaticity-correction thin film on a reflective electrode for preventing a tint in reflective display, transmissive contrast of the same level as that of the second conventional configuration was obtained. Moreover, in the liquid crystal display device of the present invention, variation in contrast among the samples of the liquid crystal display device used in measurement could be reduced compared to those of the conventional configurations (not shown in Table).

As described above, in the liquid crystal display device of the present embodiment, both of (i) a problem related to reduction in contrast caused in the first conventional configuration, and (ii) a problem of a tint in reflective display caused in the second conventional configuration can be solved. That is, the liquid crystal display device of the present embodiment makes it possible to prevent a tint in reflective display while reduction in contrast is prevented in transmissive display. This is accomplished by a configuration in which a chromaticity-correction thin film is provided not in a transmissive region but only on a reflective electrode.

Next, a manufacturing method for a liquid crystal display device of the present embodiment is explained.

A liquid crystal display device of the present embodiment can be manufactured basically according to a manufacturing method for a conventional transflective type liquid crystal display device. Note that the chromaticity-correction thin film 33 formed on a reflective electrode 32 can be formed by film formation by use of sputtering or CVD, followed by pattern formation by use of, for example, etching.

A material of the chromaticity-correction thin film 33 is not specifically limited as long as the material can correct chromaticity so as to prevent reflective display from being tinged with blue in displaying black. Examples of such a material are IZO, ITO, MoN, $SiO_2$, silicon nitride (SiNx), and the like.

Among the above materials, a film formation by using metal-containing materials such as IZO, ITO, and MoN can be performed by, for example, sputtering. On the other hand, a film formation by using silicon-containing materials such as $SiO_2$ and silicon nitride (SiNx) can be performed by, for example, CVD.

In a case where the reflective electrode 32 is formed from Al (including a case where an Al layer is formed on an Mo layer), the chromaticity-correction thin film 33 is preferably formed from IZO or MoN. This is because the reflective electrode 32 formed from Al and the chromaticity-correction thin film 33 can be simultaneously etched in a case where a first etching solution (a mixed solution of nitric acid, phosphoric acid, acetic acid, and water) described in Patent Literature 4 is used. As just described, in a case where the chromaticity-correction thin film 33 is formed from IZO or MoN, an advantage in a manufacturing processes can be obtained.

Figure 9:
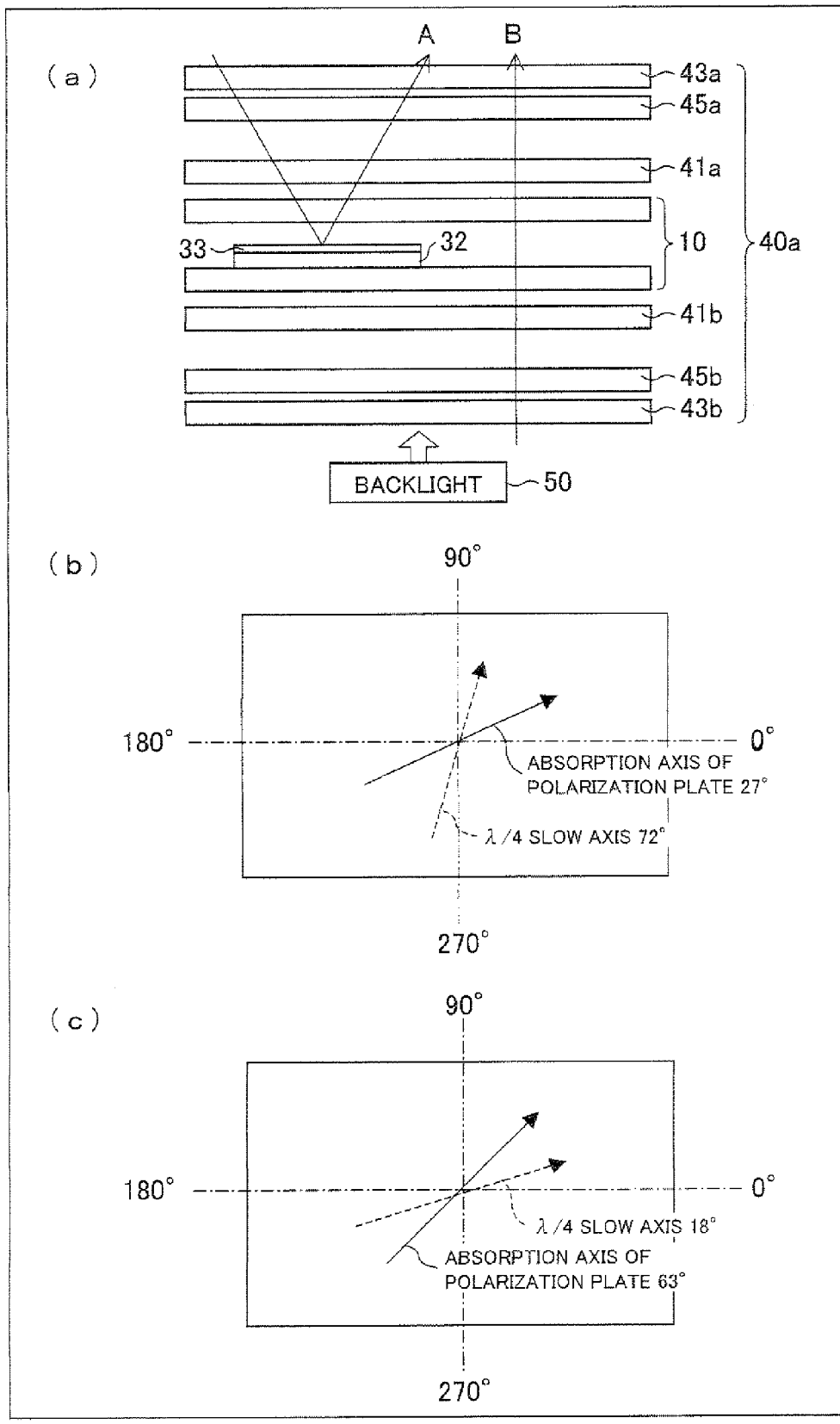
FIG. 9

Next, another embodiment of the present invention is described. (a) of FIG. 9 illustrates a schematic configuration of a liquid crystal display device of another embodiment of the present invention. The liquid crystal display device is different from the liquid crystal display device shown in (a) of FIG. 2, only in that a birefringent layer for correcting a viewing angle is further provided between a polarization plate and a λ/4 plate. Therefore, the same names and the same numerals are given to the same members as those described above. Explanations for these members are omitted, and explanations for only different members are given. Note that, regarding the birefringent layer, a conventionally used general birefringent layer for improving a viewing angle of a liquid crystal display device can be used also for the present invention.

In a liquid crystal panel 40a shown in (a) of FIG. 9, a front-side birefringent layer 45a is provided between a front-side polarization plate 43a and a front-side λ/4 plate 41a, and a back-side birefringent layer 45b is provided between a back-side polarization plate 43b and a back-side λ/4 plate 41b. The configuration other than this is the same as the configuration of the liquid crystal panel 40 shown in (a) of FIG. 2.

(b) of FIG. 9 illustrates axis angles of the front-side polarization plate 43a, the front-side λ/2 plate 42a, and the front-side λ/4 plate 41a provided in the liquid crystal panel 40a in (a) of FIG. 9 (Note that: a right hand of the (b) of FIG. 9 viewed from front is regarded as 0 degree as a basic angle, and each axis angle indicates an angle counterclockwise from the basic angle). Moreover, (c) of FIG. 9 illustrates axis angles of the back-side polarization plate 43b, the back-side λ/2 plate 42b, and the back-side λ/4 plate 41b provided in the liquid crystal panel 40a in (a) of FIG. 9 (Note that: a right hand of the (c) of FIG. 9 viewed from front is regarded as 0 degree as a basic angle, and each axis angle indicates an angle counterclockwise from the basic angle).

All of these axis angles are the same as those of the liquid crystal panel 40 of the present invention shown in (a) of FIG. 2. That is, optical axes of the polarization plates and the wave plates shown in (b) of FIG. 9 and (c) of FIG. 9 represent axis angles on surfaces of the plates, as in (b) of FIG. 2 and (c) of FIG. 2. That is, regarding the front-side polarization plate and wave plate shown in (b) of FIG. 9, the axis angles indicate angles obtained when the liquid crystal panel 40a is viewed on a display-face side. On the other hand, regarding the back-side polarization plate and wave plate shown in (c) of FIG. 9, the axis angles indicate angles obtained when the liquid crystal panel 40a is viewed on a backlight side.

Here, a configuration (a third conventional configuration) of a conventional transflective type liquid crystal display device having a birefringent layer is explained for comparison. (a) of FIG. 10 illustrates the third conventional configuration.

Figure 10:
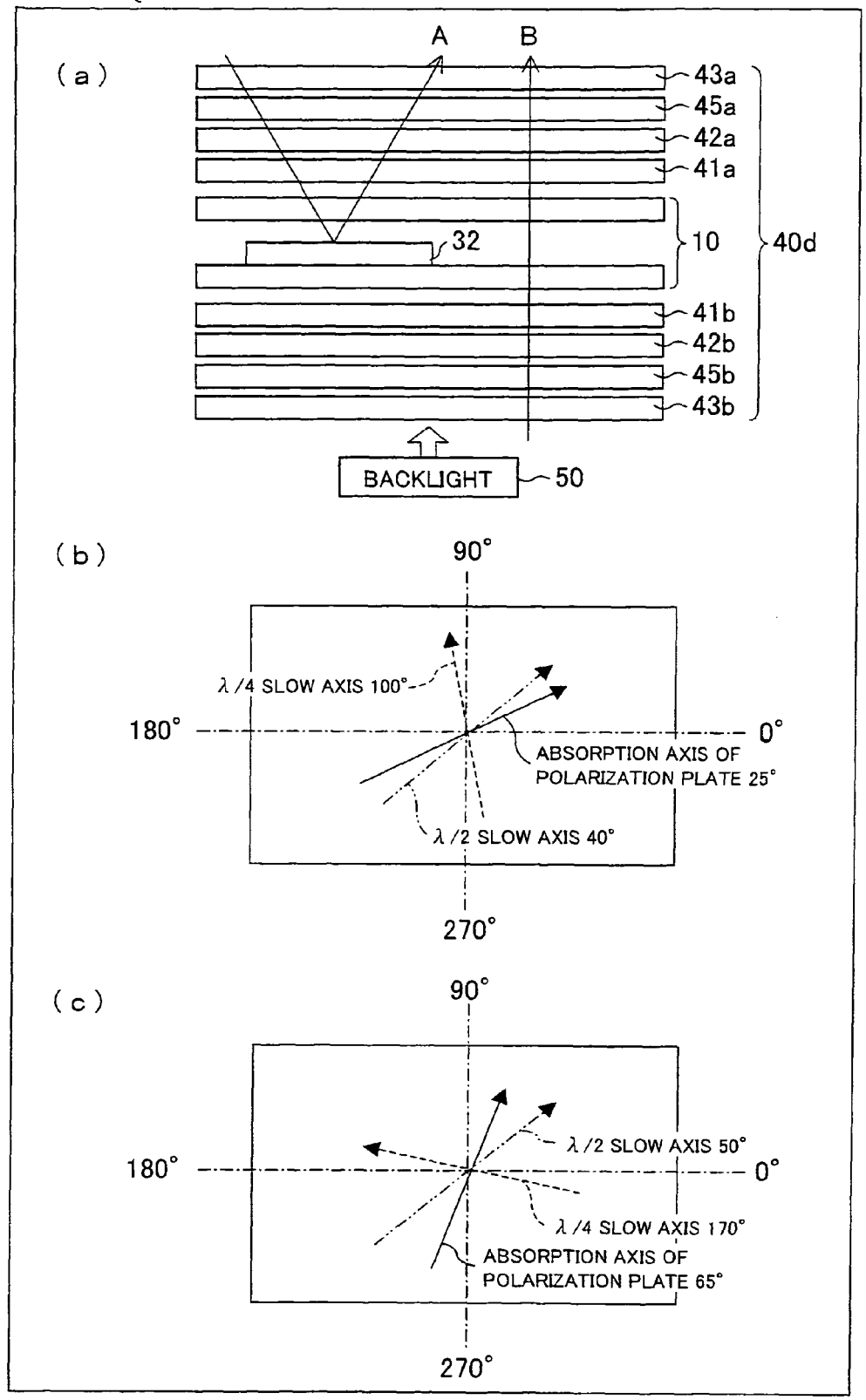
FIG. 10

A liquid crystal panel 40d provided in a liquid crystal display device shown in (a) of FIG. 10 includes a front-side λ/2 plate 42a between a front-side polarization plate 43a and a front-side λ/4 plate 41a, for correcting a tint in reflective display caused by including the front-side λ/4 plate 41a. Moreover, a back-side λ/2 plate 42b is further provided between a back-side polarization plate 43b and a back-side λ/4 plate 41b, for canceling an influence of the front-side λ/2 plate 42a on a phase difference (i.e. restoring the altered polarized state) in transmissive display.

As shown in the third conventional configuration, a λ/2 plate is provided instead of a chromaticity-correction thin film formed on a reflective electrode. The configuration other than this is the same as the configuration of the liquid crystal display device shown in (a) of FIG. 9.

(b) of FIG. 10 illustrates axis angles of the front-side polarization plate 43a, the front-side λ/2 plate 42a, and the front-side λ/4 plate 41a provided in the liquid crystal panel 40d in (a) of FIG. 10 (Note that: a right hand of the (b) of FIG. 10 viewed from front is regarded as 0 degree as a basic angle, and each axis angle indicates an angle counterclockwise from the basic angle). Moreover, (c) of FIG. 10 illustrates axis angles of the back-side polarization plate 43b, the back-side λ/2 plate 42b, and the back-side λ/4 plate 41b provided in the liquid crystal panel 40d in (a) of FIG. 10 (Note that: a right hand of the (c) of FIG. 10 viewed from front is regarded as 0 degree as a basic angle, and each axis angle indicates an angle counterclockwise from the basic angle).

All of these axis angles are the same as those of the conventional liquid crystal panel 40b shown in (a) of FIG. 3. That is, optical axes of the polarization plates and the wave plates shown in (b) of FIG. 10 and (c) of FIG. 10 represent axis angles on surfaces of the plates, as in (b) of FIG. 3 and (c) of FIG. 3. That is, regarding the front-side polarization plate and wave plate shown in (b) of FIG. 10, the axis angles indicate angles obtained when the liquid crystal panel 40b is viewed on a display-face side. On the other hand, regarding the back-side polarization plate and wave plate shown in (c) of FIG. 10, the axis angles indicate angles obtained when the liquid crystal panel 40b is viewed on a backlight side.

Table 5 shows respective retardation values of members of the liquid crystal panel 40a. Note that the retardation values are shown as examples and not limited to these examples.

TABLE 5

| Panel Members | Retardation Value (d · Δn) |
|---|---|
| Polarization Plate | — |
| Birefringent layer | Rth = 90 nm |
| λ/4 plate | 140 nm |
| Liquid Crystal Cell | Reflection: 170 nm    Transmission: 330 nm |
| λ/4 plate | 140 nm |
| Birefringent layer | Rth = 90 nm |
| Polarization Plate | — |

Rth: Phase difference in thickness direction

As described above, the liquid crystal display device shown in (a) of FIG. 9 is provided with a chromaticity-correction thin film only on a reflective electrode, instead of a λ/2 plate for chromaticity correction provided in the third conventional configuration. Therefore, a tint in reflective display can be corrected while contrast in transmissive display is not reduced by the chromaticity-correction thin film.

Note that preferable materials, film thickness, and the like of the chromaticity-correction thin film are the same as those of the liquid crystal display device shown in (a) of FIG. 2.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

With the present invention, a tint in reflective display can be prevented while contrast in transmissive display is not reduced. That is, the present invention can provide a transflective type liquid crystal display device having a high display quality. A transflective type liquid crystal display device of the present invention is suitable for use in display devices for various kinds of electronics devices, for example, mobile devices such as a PDA and a cellular phone, audio-video equipment such as a television set, and audio-video equipment such as a personal computer.

The invention claimed is:

1. A transflective type liquid crystal display device, comprising:
   a liquid crystal panel displaying an image through both a reflective display region and a transmissive display region, wherein:
   the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;
   the reflective electrode is provided with a thin film for suppressing wavelength dispersion caused by the wave plate; and
   wherein the wave plate is a $\lambda/4$ wavelength plate.

2. The transflective type liquid crystal display device as set forth in claim 1, wherein: the thin film is formed from a material selected from a group including IZO, ITO, MoN, $SiO_2$, and silicon nitride.

3. The transflective type liquid crystal display device as set forth in claim 1, wherein: the reflective electrode is formed from Al; and the thin film is formed from IZO or MoN.

4. The transflective type liquid crystal display device as set forth in claim 1, wherein: when the thin film is formed from IZO, a thickness of the thin film is 100 Å to 300 Å.

5. The transflective type liquid crystal display device as set forth in claim 1, further comprising:
   another wave plate on another side of the liquid crystal layer, the another side being opposite from the side provided with the wave plate; and
   two polarization plates, wherein:
   from the side from which external light enters, one of the polarization plates, the wave plate, the liquid crystal layer, the another wave plate, and the other one of the polarization plates in this order are provided.

6. A transflective type liquid crystal display device, comprising:
   a liquid crystal panel displaying an image through both a reflective display region and a transmissive display region, wherein:
   the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;
   the reflective electrode is provided with a thin film for suppressing wavelength dispersion caused by the wave plate; and
   wherein the thin film is a thin film whose transmissivity at a wavelength of 450 nm is 97% or less in displaying black.

7. The transflective type liquid crystal display device as set forth in claim 6, wherein: the wave plate is a $\lambda/4$ wavelength plate.

8. A transflective type liquid crystal display device, comprising:
   a liquid crystal panel displaying an image through both a reflective display region and a transmissive display region, wherein:
   the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;
   the reflective electrode is provided with a thin film for suppressing wavelength dispersion caused by the wave plate; and
   wherein the thin film is formed from MoN, and a thickness of the thin film is 20 Å to 80 Å.

9. A transflective type liquid crystal display device, comprising:
   a liquid crystal panel displaying an image through both a reflective display region and a transmissive display region, wherein:
   the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;
   the reflective electrode is provided with a thin film for suppressing wavelength dispersion caused by the wave plate;
   another wave plate on another side of the liquid crystal layer, the another side being opposite from the side provided with the wave plate; and
   two polarization plates, wherein:
   from the side from which external light enters, one of the polarization plates, the wave plate, the liquid crystal layer, the another wave plate, and the other one of the polarization plates in this order are provided; and
   the wave plate is a $\lambda/4$ wavelength plate; and the polarization plate and the $\lambda/4$ wavelength plate that are provided on the side from which external light enters the liquid crystal layer are arranged so that a slow axis of the $\lambda/4$ wavelength plate is shifted by an angle of 45 degrees counterclockwise with respect to a polarized light absorption axis of the polarization plate.

10. A transflective type liquid crystal display device, comprising:
    a liquid crystal panel displaying an image through both a reflective display region and a transmissive display region, wherein:

the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;

the reflective electrode is provided with a thin film for suppressing wavelength dispersion caused by the wave plate;

another wave plate on another side of the liquid crystal layer, the another side being opposite from the side provided with the wave plate; and two polarization plates, wherein:

from the side from which external light enters, one of the polarization plates, the wave plate, the liquid crystal layer, the another wave plate, and the other one of the polarization plates in this order are provided;

slow axes of the wave plate and the another wave plate sandwiching the liquid crystal layer are arranged so as to be shifted from each other by an angle of 90 degrees when viewed from a same side of the liquid crystal layer; and polarized light absorption axes of the two polarization plates sandwiching the liquid crystal layer is arranged so as to be shifted by an angle of 90 degrees from each other when viewed from the same side of the liquid crystal layer.

11. A transflective type liquid crystal display device, comprising:

a liquid crystal panel displaying an image through both a reflective display region and a transmissive display region, wherein:

the liquid crystal panel includes (i) a reflective electrode for reflecting incident external light, the reflective electrode located in the reflective display region, and (ii) a protrusion under the reflective electrode, the reflective display region and the transmissive display region being different in thickness of a liquid crystal layer from each other, only one wave plate for performing reflective display in said reflective display region being provided on a side of a liquid crystal layer in the liquid crystal panel from which side external light enters the liquid crystal layer;

the reflective electrode is provided with a thin film for suppressing wavelength dispersion caused by the wave plate;

another wave plate on another side of the liquid crystal layer, the another side being opposite from the side provided with the wave plate; and two polarization plates, wherein:

from the side from which external light enters, one of the polarization plates, the wave plate, the liquid crystal layer, the another wave plate, and the other one of the polarization plates in this order are provided; and a birefringent layer for correcting a viewing angle is provided between one of the polarization plates and the wave plate and another birefringent layer for correcting a viewing angle is provided between the another wave plate and the other one of the polarization plates.

* * * * *